United States Patent
Choi et al.

(10) Patent No.: US 11,522,204 B1
(45) Date of Patent: Dec. 6, 2022

(54) METHOD AND APARATUS FOR CONTROLLING TEMPERATURE OF COOLANT IN FUEL CELL SYSTEM

(71) Applicant: HYUNDAI MOBIS CO., LTD., Seoul (KR)

(72) Inventors: Sung Kyung Choi, Yongin-si (KR); Jong Bo Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/513,036

(22) Filed: Oct. 28, 2021

(30) Foreign Application Priority Data

May 21, 2021 (KR) .................. 10-2021-0065745

(51) Int. Cl.
  *H01M 8/04029* (2016.01)
  *H01M 8/0438* (2016.01)
  *H01M 8/0432* (2016.01)

(52) U.S. Cl.
  CPC ... *H01M 8/04029* (2013.01); *H01M 8/04358* (2013.01); *H01M 8/04417* (2013.01); *H01M 2250/20* (2013.01)

(58) Field of Classification Search
  CPC ......... H01M 8/04029; H01M 8/04358; H01M 8/04417
  See application file for complete search history.

(56) References Cited

U.S. PATENT DOCUMENTS

| | | | |
|---|---|---|---|
| 2005/0003250 A1* | 1/2005 | Toukura | H01M 8/04156 429/430 |
| 2016/0141679 A1 | 5/2016 | Yamada et al. | |
| 2018/0183078 A1* | 6/2018 | Yamada | H01M 8/04276 |
| 2018/0183080 A1* | 6/2018 | Yamada | H01M 8/04067 |
| 2019/0165395 A1 | 5/2019 | Folick et al. | |
| 2022/0029182 A1 | 1/2022 | Li et al. | |

FOREIGN PATENT DOCUMENTS

| | | |
|---|---|---|
| CN | 111439167 A | 7/2020 |
| JP | 2016-134337 A | 7/2016 |

OTHER PUBLICATIONS

Extended European search report dated May 18, 2022, in counterpart European Patent Application No. 21207217.7 (9 pages in English).

* cited by examiner

*Primary Examiner* — Stewart A Fraser
(74) *Attorney, Agent, or Firm* — NSIP Law (57) ABSTRACT

A fuel cell system includes a fuel cell stack, a first cooling line configured to circulate a first coolant that passes via the fuel cell stack, a first radiator disposed on the first cooling line, a valve configured to switch a flow path of the first coolant to the fuel cell stack or the first radiator, and a controller connected to the valve and configured to set a target temperature at an inlet of the fuel cell stack and a correction coefficient for controlling an opening degree of the valve, measure a first coolant temperature at an outlet of the fuel cell stack and a second coolant temperature at an outlet of the first radiator, calculate the opening degree of the valve based on the first coolant temperature, the second coolant temperature, the target temperature, and the correction coefficient, and correct the correction coefficient based on comparison of a third coolant temperature at the inlet of the fuel cell stack and the target temperature, in response to the opening degree being within a first range.

13 Claims, 9 Drawing Sheets

METHOD AND APARATUS FOR CONTROLLING TEMPERATURE OF COOLANT IN FUEL CELL SYSTEM

CROSS-REFERENCE TO RELATED APPLICATION

This application claims the benefit under 35 U.S.C. § 119 (a) of priority to Korean Patent Application No. 10-2021-0065745, filed in the Korean Intellectual Property Office on May 21, 2021, the entire contents of which are incorporated herein by reference for all purposes.

BACKGROUND

1. Field

Embodiments of the present disclosure relate to a technology for controlling a temperature of coolant in a fuel cell system.

2. Description of Related Art

A fuel cell system may generate electric energy by using a fuel cell stack. For example, when hydrogen is used as a fuel of the fuel cell stack, it may be a measure of solving global environmental problems, and thus researches and developments on fuel cell systems have been continuously made. A fuel cell system may include a fuel cell stack that generates electrical energy, a fuel supply device that supplies a fuel (hydrogen) to the fuel cell stack, an air supply device that supplies oxygen in air, which is an oxidizer that is necessary for an electric chemical reaction, to the fuel cell stack, and a thermal management system (TMS) that removes reaction heat of the fuel cell stack to the outside, controls an operation temperature of the fuel cell stack, and performs a water management function.

The thermal management system is a kind of a cooling device that circulates an anti-freezing liquid that functions as coolant in a fuel cell stack and maintain the fuel cell stack at a proper temperature (for example, 60 to 70° C.), and may include a TMS line, in which the coolant circulates, a reservoir in which the coolant is stored, a pump that circulates the coolant, and an ion filter that removes ions included in the coolant, and a radiator that discharges the heat of the coolant to the outside. Furthermore, the thermal management system may include a heater that heats the coolant, and an air conditioning unit (for example, a heater for heating) that cools and heats an interior of a device (e.g., a vehicle) including the fuel cell system by using the coolant. The thermal management system may maintain a proper temperature of a power electronic component of the vehicle as well as the fuel cell stack.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided a temperature control apparatus for fuel cell system including a fuel cell stack, a first cooling line configured to circulate a first coolant that passes via the fuel cell stack, a first radiator disposed on the first cooling line and being configured to cool the first coolant, a valve configured to switch a flow path of the first coolant to the fuel cell stack or the first radiator, and a controller connected to the valve, and the controller being configured to set a target temperature at an inlet of the fuel cell stack and a correction coefficient for controlling an opening degree of the valve, measure a first coolant temperature at an outlet of the fuel cell stack and a second coolant temperature at an outlet of the first radiator, calculate the opening degree of the valve based on the first coolant temperature, the second coolant temperature, the target temperature, and the correction coefficient, and correct the correction coefficient based on comparison of a third coolant temperature at the inlet of the fuel cell stack and the target temperature, in response to the opening degree being within a first range.

The controller may be configured to set the correction coefficient to be a previous value, in response to a difference between the third coolant temperature and the target temperature being within a second range, decrease the correction coefficient, in response to the difference between the third coolant temperature and the target temperature deviating from the second range and the target temperature being higher than the third coolant temperature, and increase the correction coefficient, in response to the difference between the third coolant temperature and the target temperature deviating from the second range and the target temperature being lower than the third coolant temperature.

The apparatus may include a first temperature sensor disposed at the inlet of the fuel cell stack, a second temperature sensor disposed at the outlet of the fuel cell stack, and a third temperature sensor disposed at the outlet of the first radiator.

The apparatus may include a cooling fan disposed on the first cooling line and configured to blow exterior air to the first radiator, and a pump disposed on the first cooling line and configured to pump the first coolant, wherein the controller is configured to control an RPM of at least one of the cooling fan and the pump, in response to the opening degree deviating from the first range.

The controller may be configured to control the RPM of the cooling fan and the RPM of the pump such that a total power consumption becomes minimal as the third coolant temperature reaches the target temperature through a decrease in the RPM of the cooling fan and an increase in the RPM of the pump, where the total power consumption is a sum of a power consumption corresponding to the RPM of the cooling fan and a power consumption corresponding to the RPM of the pump.

The controller may include a valve controller configured to control the opening degree of the valve, a cooling fan controller configured to control the RPM of the cooling fan, and a pump controller configured to control the RPM of the pump.

The valve controller, the cooling fan controller, and the pump controller may be integrated in one module.

The apparatus may include a second cooling line configured to circulate a second coolant that passes via an electric component, a second radiator disposed on the second cooling line and being configured to cool the second coolant, a heat exchanger configured to exchange heat between the first coolant and the second coolant, and a cooling fan configured to cool any one or any combination of the first radiator and the second radiator.

In another general aspect, there is provided a processor-implemented method for operating a fuel cell system including a fuel cell stack, the method including setting a target temperature at an inlet of the fuel cell stack and a correction coefficient for controlling an opening degree of a valve, measuring a first coolant temperature at an outlet of the fuel cell stack and a second coolant temperature at an outlet of a first radiator, calculating the opening degree of the valve based on the first coolant temperature, the second coolant temperature, the target temperature, and the correction coefficient, and correcting the correction coefficient based on comparison of a third coolant temperature at the inlet of the fuel cell stack and the target temperature, in response to the opening degree being within a first range.

The correcting of the correction coefficient includes setting the correction coefficient to a previous value, in response to a difference between the third coolant temperature and the target temperature being within a second range, decreasing the correction coefficient, in response to the difference between the third coolant temperature and the target temperature deviating from the second range and the target temperature being higher than the third coolant temperature, and increasing the correction coefficient, in response to the difference between the third coolant temperature and the target temperature deviating from the second range and the target temperature being lower than the third coolant temperature.

The method may include controlling an RPM of any one or any combination of a cooling fan and a pump, in response to the opening degree deviating from the first range.

The controlling of the RPM may include controlling the RPM of the cooling fan and the RPM of the pump such that a total power consumption becomes minimal as the third coolant temperature reaches the target temperature through a decrease in the RPM of the cooling fan and an increase in the RPM of the pump, where the total power consumption is a sum of a power consumption corresponding to the RPM of the cooling fan and a power consumption corresponding to the RPM of the pump.

Other features and aspects will be apparent from the following detailed description, the drawings, and the claims

BRIEF DESCRIPTION OF THE DRAWINGS

The above and other objects, features and advantages of the present disclosure will be more apparent from the following detailed description taken in conjunction with the accompanying drawings.

With regard to description of drawings, the same or similar components may be marked by the same or similar reference numerals.

DETAILED DESCRIPTION

Hereinafter, various embodiments of the present disclosure will be described with reference to the accompanying drawings. Accordingly, those of ordinary skill in the art will recognize that modifications, equivalents, and/or alternatives on the various embodiments described herein can be variously made without departing from the scope and spirit of the present disclosure.

Various embodiments of the present disclosure and the terms used herein do not limit the technical features described in the present disclosure to specific embodiments, and should be construed to include various modifications, equivalents, or replacements of the embodiments. With regard to the description of drawings, similar components may be denoted by similar reference numerals. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd" or "first" and "second" may be used to simply distinguish a corresponding component from another, and does not limit the components in other aspects (e.g., an importance or an order). It is to be understood that if an element (e.g., a first element) is referred to, with or without the term "operatively" or "communicatively", as "coupled with" or "connected with", it means that the element may be coupled with the other element directly (e.g., by wire), wirelessly, or via a third element.

The term "module" used in various embodiments of the present disclosure may include a unit implemented in hardware, software, or firmware way, and for example, may be used interchangeably with the terms such as logic, a logic block, a component, or a circuit. The module may be an integral component, or a minimum unit or a part which performs one or more functions. For example, according to an embodiment, the module may be implemented in a form of an application-specific integrated circuit (ASIC).

Various embodiments of the present disclosure may be implemented by software (e.g., a program) including one or more instructions stored in a storage medium (e.g., an internal memory or an external memory) that may be read by a machine. For example, a device may call, among one or more instructions stored in a storage medium, at least one instruction, and may execute the instruction. This allows at least one function to be performed according to the called at least one instruction. The one or more instructions may include a code that is made by a compiler or a code that may be executed by an interpreter. The storage medium that may be read by a device may be provided in a form of a non-transitory storage medium. Here, the 'non-transitory storage medium' means that the storage medium is a tangible device and does not include a signal (e.g., an electromagnetic wave), and with regard to the term, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM)) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, elements (e.g., modules or programs) of the above-described elements may include one or a plurality of entities, and some of the plurality of entities may be disposed to be separated from the other elements. According to various embodiments, among the above-described elements, one or more elements or operations may be omitted or one or more other elements or operations may be added. Alternatively or additionally, the plurality of elements (e.g., modules or programs) may be integrated into one element. In this case, the integrated elements may perform one or more functions of the elements of the plurality of elements in a way that is the same as or similar to the functions performed by the corresponding elements of the plurality of elements before the integration. According to various embodiments, the operations performed by modules, programs, or other elements may be executed sequentially, in parallel, repeatedly, or heuristically, one or more operations may be executed in another sequence or omitted, or one or more other operations may be added.

Figure 1:
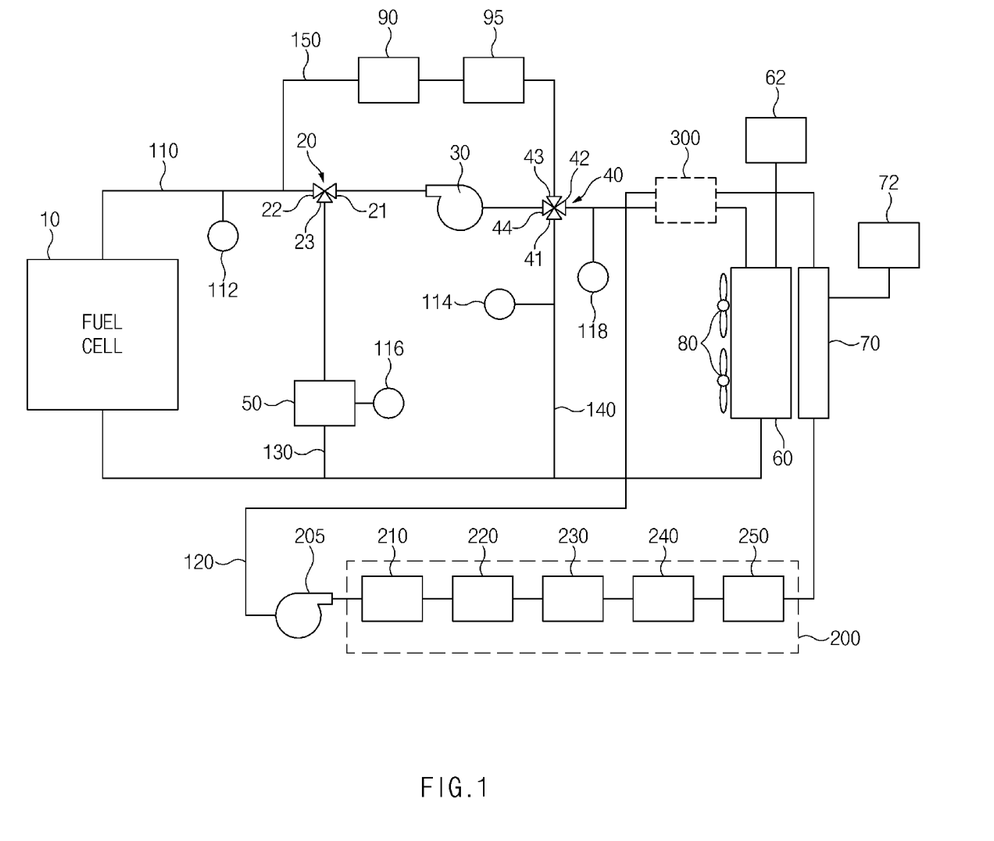
FIG. 1 illustrates a fuel cell system according to various embodiments.
Figure 2:
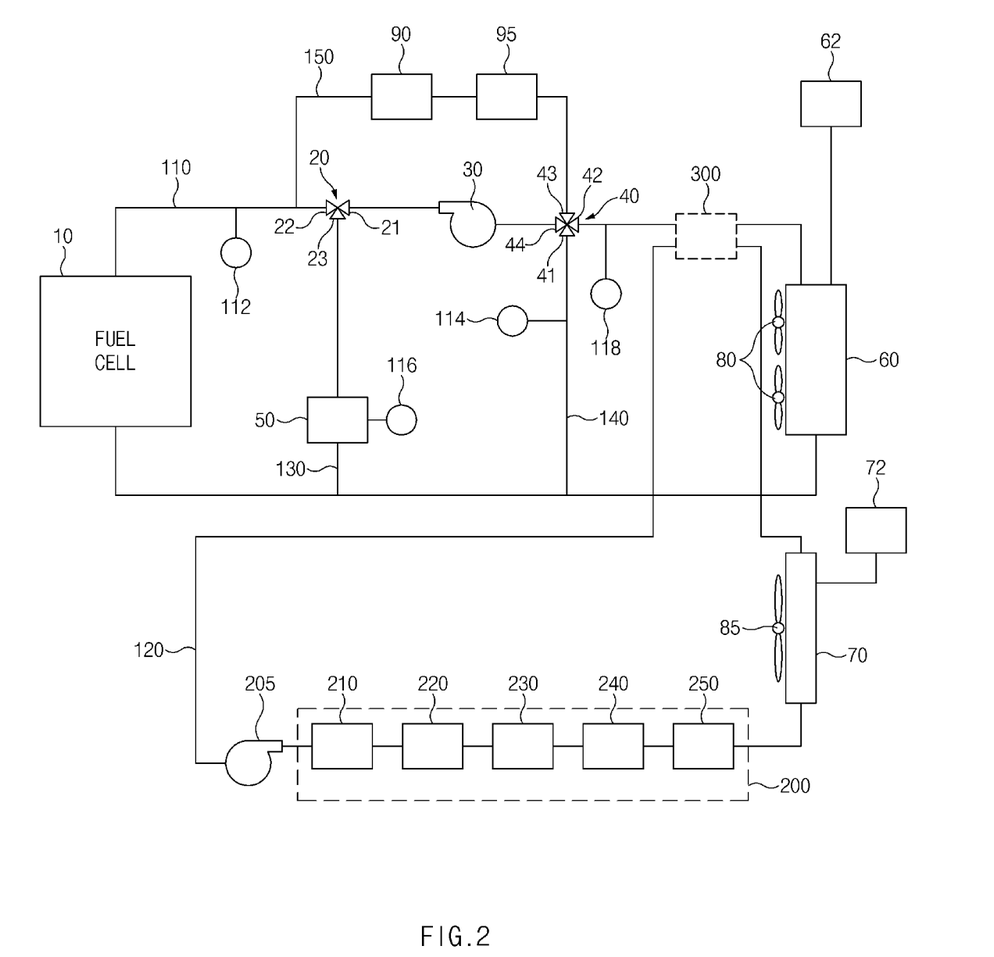
FIG. 2 illustrates a fuel cell system according to various embodiments.

FIGS. 1 and 2 illustrate a fuel cell system according to various embodiments.

Referring to FIG. 1, a fuel cell system for a vehicle may include a first cooling line 110, in which first coolant that passes via a fuel cell stack 10 of the vehicle circulates, and a second cooling line 120, in which second coolant that passes via a power electronic part 200 of the vehicle circulates. In the embodiment, the fuel cell system may further include a heat exchanger 300 that exchanges heat between the first coolant and the second coolant, but the heat exchanger 300 may be omitted.

The fuel cell system may include a first connection line 130, a second connection line 150, and a third connection line 140 to form a heating loop (a heating circulation path) with the first cooling line 110 or form a cooling line with the first cooling line 110. The first coolant may be cooled or heated while circulating in the first connection line 130, the second connection line 150, or the third connection line 140. As an example, the first cooling line 110 may form a heating loop with the first connection line 130 and the third connection line 140 to secure a cold start capacity in an initial start condition of the vehicle, and may form a cooling loop, in which the first coolant passes through a first radiator 60 such that heat generated by the fuel cell stack 10 is emitted to the outside while driving of the vehicle. In another embodiment, when a temperature of exterior air is as high as a specific temperature, the first cooling line 110 does not form a heating loop and the fuel cell system may secure a start capacity through heat of the fuel cell stack 10. The fuel cell stack 10, a first valve 20, a first pump 30, a second valve 40, and the first radiator 60 may be disposed on the first cooling line 110, in which the first coolant circulates.

The fuel cell stack 10 (or may be referred to as a 'fuel cell') may have a structure, in which electricity may be produced through an oxidation/reduction reaction of a fuel (for example, hydrogen) and an oxidizer (for example, air). As an example, the fuel cell stack 10 may include a membrane electrode assembly (MEA), in which catalyst electrode layers for an electric chemical reaction are attached to opposite sides of a membrane with respect to an electrolyte membrane, through which hydrogen ions travel, a gas diffusion layer (GDL) that uniformly distributes reaction gases and delivers generated electrical energy, a gasket and a coupling mechanism for maintaining a tightness and a proper coupling pressure of the reaction gases and the first coolant, and a bipolar plate that causes the reaction gases and the first coolant to flow.

In the fuel cell stack 10, the hydrogen that is the fuel and the air (oxygen) that is the oxidizer are supplied to an anode and a cathode of the membrane electrode assembly, and the hydrogen may be supplied to the anode and the air may be supplied to the cathode. The hydrogen supplied to the anode is decomposed into protons and electrons by a catalyst of the electrode layers provided on opposite sides of the electrolyte membrane, and among them, only the hydrogen ions may be delivered to the cathode after selectively passing the electrolyte membrane that is a cation exchange membrane, and the electrons may be delivered to the cathode through the gas diffusion layer and the bipolar plate being conductors. In the cathode, the hydrogen ions supplied through the electrolyte membrane and the electrons delivered through the bipolar plate may meet oxygen in the air supplied to the cathode by an air supply device and generate a reaction of generating water. Then, the electrons may flow through an external wire due to the flows of the hydrogen ions, and electric currents may be generated due to the flows of the electrons.

The first valve 20 may switch a flow path of the first coolant to the first connection line 130, in which a heater 50 is disposed, or the fuel cell stack 10 on the first cooling line 110. For example, the first valve 20 may be connected to one end of the first pump 30, one end of the first connection line 130, and one end of the fuel cell stack 10 on the first cooling line 110. The first valve 20 may include various valve means that may selectively switch the flow path of the first coolant. As an example, the first valve 20 may be a 3-way valve. In this case, the first valve 20 may include a first port 21 connected to the first cooling line 110 such that the first coolant pumped by the first pump 30 is introduced therethrough, a second port 22 connected to the first cooling line 110 such that the first coolant that passes through the first valve 20 is introduced into the fuel cell stack 10, and a third port 23 connected to one end of the first connection line 130. As the second port 22 and the third port 23 of the first valve 20 are opened and closed, the flow path of the first coolant may be switched to the heater 50 of the first connection line 130 or the fuel cell stack 10. That is, when the second port 22 is opened and the third port 23 is blocked, the first coolant may be introduced into the fuel cell stack 10, and to the contrary, when the third port 23 is opened and the second port 22 is blocked, the first coolant may be introduced into the heater 50 through the first connection line 130.

The first connection line 130 may form a heating loop (a heating circulation path) with the first cooling line 110 to heat the first coolant. For example, the first coolant that flows along the first connection line 130 may be heated while passing through the heater 50 installed in the first connection line 130. One end of the first connection line 130 may be connected to the first cooling line 110 at a first point located between an outlet of the first pump 30 and the fuel cell stack 10, and another end of the first connection line 130 may be connected to the first cooling line 110 at a second point located between an inlet of the first pump 30 and the fuel cell stack 10. Here, the inlet of the first pump 30 may be defined as an inlet, through which the first coolant is introduced into the first pump 30. Furthermore, the outlet of the first pump 30 may be defined as an outlet, through which the first coolant that passed through the first pump 30 is discharged. Furthermore, a section between the outlet of the first pump 30 and the fuel cell stack 10 may be defined as a section, in which the first coolant discharged from the first pump 30 flows to a first coolant inlet (not illustrated) of the fuel cell stack 10. Furthermore, a section between the inlet of the first pump 30 and the fuel cell stack 10 may be defined as a section, in which the first coolant discharged from a coolant outlet (not illustrated) of the fuel cell stack 10 flows to the inlet of the first pump 30.

The first pump 30 may be configured to cause the first coolant to compulsorily flow. The first pump 30 may include various means that may pump the first coolant, and the kinds and the number of the first pumps 30 are not limited in the present disclosure.

The second valve 40 may switch the flow path of the first coolant to the first radiator 60 or the fuel cell stack 10 on the first cooling line 110. For example, the second valve 40 may be provided on the first cooling line 110 to be located between the first pump 30 and the first radiator 60, and may be connected to one end of the third connection line 140 and the outlet of the first radiator 60. The second valve 40 may include various valve means that may selectively switch the flow path of the first coolant to the first radiator 60 or the fuel cell stack 10. As an example, the second valve 40 may be a 4-way valve or a 3-way valve. When the second valve 40 is a 3-way valve, it may include a first port 41 connected to the third connection line 140, a second port 42 connected to the first cooling line 110 such that the first coolant that passes through the first radiator 60 is introduced therethrough, and a fourth port 44 connected to the first cooling line 110 such that the first coolant is introduced into the first pump 30, and when the second valve 40 is a 4-way valve, it may further include a third port 43 connected to one end of the second connection line 150. As the first port 41 or the second port 42 of the second valve 40 is opened and closed, the flow path of the first coolant may be switched to the first radiator 60 or the fuel cell stack 10. That is, when the first port 41 is opened and the second port 42 is blocked, the first coolant is introduced into the fuel cell stack 10 while not passing through the first radiator 60, and to the contrary, when the second port 42 is opened and the first port 41 is blocked, the first coolant may be introduced into the fuel cell stack 10 after passing through the first radiator 60.

The second connection line 150 may form a heating loop with the first cooling line 110 to heat an air conditioning unit (an HVAC unit) 90. As an example, the second connection line 150 may form a loop that heats a heater (not illustrated) for heating of the air conditioning unit 90. One end of the second connection line 150 may be connected to the first cooling line 110 between the first point (the point, at which one end of the first connection line 130 is connected to the first cooling line 110) and the inlet of the fuel cell stack 10, and a portion of the first coolant may circulate through the second connection line 150. Another end of the second connection line 150 may be connected to the first cooling line 110 between the first pump 30 and the second point (the point, at which another end of the first connection line 130 is connected to the first cooling line 110).

An ion filter 95 that filters ions of the first coolant that passed through the air conditioning unit 90 may be provided in the second connection line 150. Because electric currents flow in the first coolant so that the fuel cell stack 10 is short-circuited or electric currents flow toward the first coolant when an electrical conductivity of the first coolant increases due to corrosion or exudation of the system, the first coolant has to maintain a low electrical conductivity. The ion filter 95 may be configured to remove ions included in the first coolant to maintain the electrical conductivity of the first coolant at a specific level or less. In this way, during a cold start, in which the supply of the first coolant flowing to the fuel cell stack 10 is interrupted (the second port 22 of the first valve 20 is blocked), the first coolant circulates (a temperature rising loop) via the heater 50 of the first connection line 130 and also circulates along the second connection line 150, whereby filtering (removal of ions included in the first coolant) may be made possible by the ion filter 95 provided in the second connection line 150 during the cold start. Accordingly, the electrical conductivity of the first coolant introduced into the fuel cell stack 10 immediately after the cold start may be advantageously maintained at the specific level or less.

The third connection line 140 may form a cooling loop with the first cooling line 110 to cool the first coolant. As an example, one end of the third connection line 140 may be connected to the first cooling line 110 between the first pump 30 and the first radiator 60, and another end of the third connection line 140 may be connected to the first cooling line 110 between the coolant outlet of the fuel cell stack 10 and the first radiator 60.

The first radiator 60 may be configured to cool the first coolant. The first radiator 60 may have various structures that may cool the first coolant, and the kinds and structures of the first radiator 60 are not limited or restricted in the present disclosure. The first radiator 60 may be connected to a first reservoir 62, in which the first coolant is stored.

The fuel cell system may include a first temperature sensor 112 that measures a temperature of the first coolant between the fuel cell stack 10 and the first point (the first valve 20), a second temperature sensor 114 that measures a temperature of the first coolant between another end of the first connection line 130 and the first pump 30, and a third temperature sensor 116 that measures a temperature of the coolant in the heater 50. Furthermore, the fuel cell system may include a fourth temperature sensor 118 that measures a temperature of the first coolant at the outlet of the first radiator 60. The fuel cell system may control a flow rate of the first coolant introduced into the fuel cell stack 10 based on the temperatures measured by the first temperature sensor 112, the second temperature sensor 114, the third temperature sensor 116, and the fourth temperature sensor 118. As an example, when the measured temperature of the first coolant that circulates along the first cooling line 110 is lower than a preset target temperature, the flow rate of the introduced first coolant may be controlled to be lower than a preset flow rate. In this way, because the flow rate of the first coolant introduced into the fuel cell stack 10 is controlled to be low when the measured temperature of the first coolant is low, a thermal impact or deterioration of performance due to a deviation between the temperature of the first coolant staying in the interior of the fuel cell stack 10 and the temperature of the first coolant introduced into the fuel cell stack 10 may be advantageously minimized.

The second cooling line 120 passes via the power electronic part 200, and the second coolant may circulate along the second cooling line 120. Here, the power electronic part 200 of the vehicle may be understood as a component that uses a power source of the vehicle as an energy source, and the kinds and number of the power electronic part 200 are not limited or restricted in the present disclosure. As an example, the power electronic part 200 may include at least any one of a bi-directional high voltage DC-DC converter (BHDC) 210 provided between the fuel cell stack 10 and a high-voltage battery (not illustrated) of the vehicle, a blower pump control unit (BPCU) 220 that controls a blower (not illustrated) that supplies exterior air for driving the fuel cell stack 10, a low-voltage DC-DC converter 230 that converts a DC high-voltage received from a high-voltage battery into a DC lower-voltage, an air compressor (ACP) 240 that compresses the air supplied to the fuel cell stack 10, and an air cooler 250. Although not illustrated in FIGS. 1 and 2, the power electronic part 200 may further include a DC-DC buck/boost converter.

A second pump 205 for causing the second coolant to compulsorily flow may be disposed on the second cooling line 120. The second pump 205 may include a pumping means that may pump the second coolant, and the kinds and the characteristics of the second pumps 205 are not limited or restricted.

A second radiator 70 for cooling the second coolant may be disposed on the second cooling line 120. The second radiator 70 may have various structures that may cool the second coolant, and the kinds and structures of the second radiator 70 are not limited or restricted. The second radiator 70 may be connected to a second reservoir 72, in which the second coolant is stored.

In the embodiment, the first radiator 60 and the second radiator 70, as illustrated in FIG. 1, may be cooled by one cooling fan 80 at the same time. As an example, the first radiator 60 and the second radiator 70 may be disposed in parallel, and the cooling fan 80 may be configured to blow the exterior air to the first radiator 60 and the second radiator 70. Because the first radiator 60 and the second radiator 70 are cooled by the one cooling fan 80 at the same time, the structure of the fuel cell system may be simplified and a degree of freedom of design and a space utility may be improved, and power consumption for cooling the first radiator 60 and the second radiator 70 may be minimized.

In another embodiment, as illustrated in FIG. 2, a first cooling fan 80 for cooling the first radiator 60 and a second cooling fan 85 for cooling the second radiator 70 may be disposed separately. In this case, the fuel cell system may exclude a parameter related to a thermal load of the power electronic part 200 when an RPM of the first cooling fan is controlled. The embodiments described hereafter are based on the structure of the fuel cell system of FIG. 1, but the same principle may be applied to the structure of the fuel cell system of FIG. 2.

The heat exchanger 300 may be configured to exchange heat between the first coolant and the second coolant. When the heat exchanger 300 is included, the first cooling line 110 and the second cooling line 120 may constitute a thermal management system (TMS) line, in which the first coolant and the second coolant may flow while exchanging heat, and in this case, the first coolant or the second coolant may be used as a cooling medium or a heat medium on the TMS line. For example, because the temperature of the second coolant that cools the power electronic part is lower than the temperature of the first coolant that cools the fuel cell stack 10, advantageously, the fuel cell system may lower the temperature of the first coolant without increasing the capacities of the first radiator 60 and the cooling fan 80 by exchanging heat between the first coolant and the second coolant, a cooling efficiency of the fuel cell stack 10 may be improved, and safety and reliability may be improved. Furthermore, because the fuel cell system may lower the temperature of the first coolant while the vehicle (for example, a construction machine) that cannot use driving wind is stopped, advantageously, high-output driving of the fuel cell stack 10 may be secured, and safety and durability may be improved.

In the embodiment, the heat exchanger 300 may be connected to the first cooling line 110 between the outlet of the first radiator 60 and the fuel cell stack 10, and the second cooling line 120 may connect the outlet of the second radiator 70 and the power electronic part to pass via the heat exchanger 300. For example, the first coolant may flow along the heat exchanger 300 connected to the first cooling line 110, and the second cooling line 120 may pass through an interior of the heat exchanger 300 to be exposed to the first coolant (for example, the first coolant flows along a circumference of the second cooling line 120). In this way, the fuel cell system may lower the temperature of the first coolant introduced into the fuel cell stack 10 through exchange of heat between the first coolant and the second coolant. The first temperature of the first coolant that passed through the first radiator 60 may be higher than the second temperature of the second coolant that passed through the second radiator 70, and the third temperature of the first coolant that passed through the heat exchanger 300 may be lower than the first temperature. As an example, the first temperature of the first coolant may be higher than the second temperature of the second coolant by about 10° C., and the third temperature of the first coolant that passed through the heat exchanger 300 (exchanged heat with the second coolant) may be lower than the first temperature by 1° C.

The heat exchanger 300 according to FIGS. 1 and 2 is disposed separately from the first radiator 60, but in another embodiment, the heat exchanger 300 may be directly connected to the first radiator 60. For example, the heat exchanger 300 may be connected to a specific location (a left upper end portion) of the first radiator 60, but the present disclosure is not limited thereto.

In the case of the first cooling line 110, in which the first coolant flows, the fuel cell system may measure a first coolant temperature of the inlet of the fuel cell stack 10 through the first temperature sensor 112, and may control an RPM of at least one of the first pump 30 or the cooling fan 80 such that the measured first coolant temperature reaches the target temperature. However, because the variations of the RPMs of the first pump 30 and the cooling fan 80 are large, there may be difficulty in narrowing a difference between the temperature measured through the first temperature sensor 112 and the target temperature. The fuel cell system according to the embodiments may precisely control the first coolant temperature to the target temperature through adjustment of the opening degree of the second valve 40. Furthermore, the fuel cell system according to the embodiments may control the first coolant temperature more precisely by adjusting the opening degree of the second valve 40 by using a first coolant temperature at the outlet of the fuel cell stack 10 measured through the second temperature sensor 114 and a first coolant temperature at the outlet of the first radiator 60 measured through the fourth temperature sensor 118.

Figure 3:
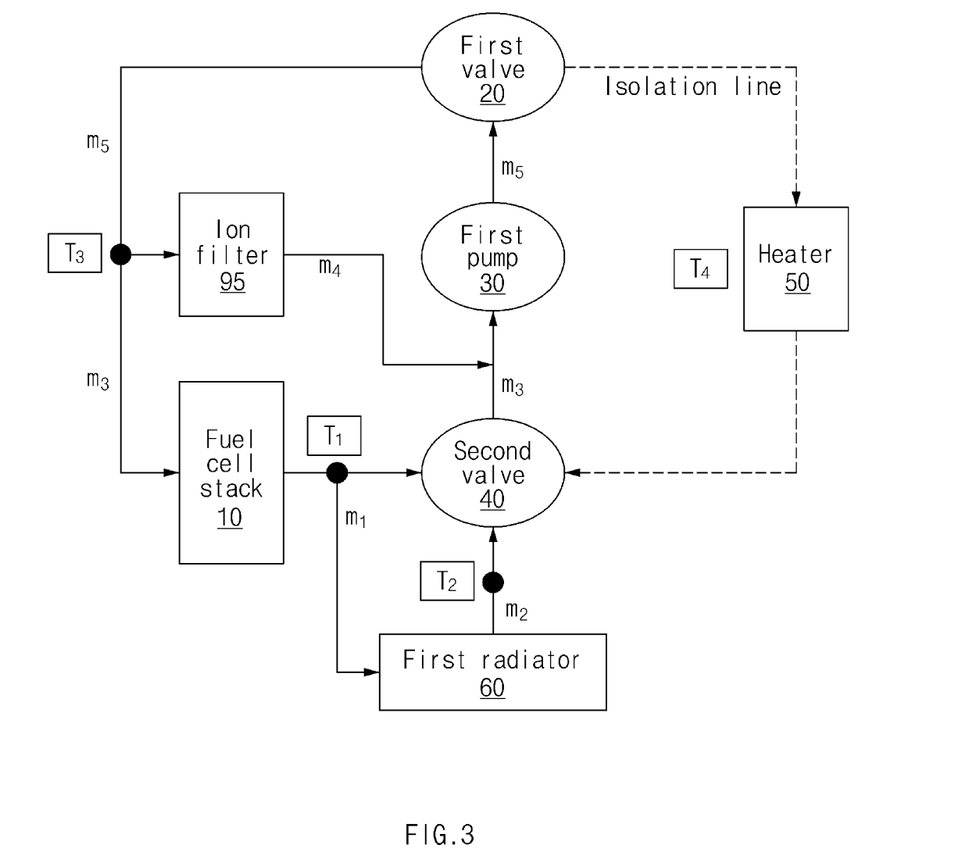
FIG. 3 illustrates a block diagram of a fuel cell system, in which first coolant flows, according to various embodiments.
Figure 4A:
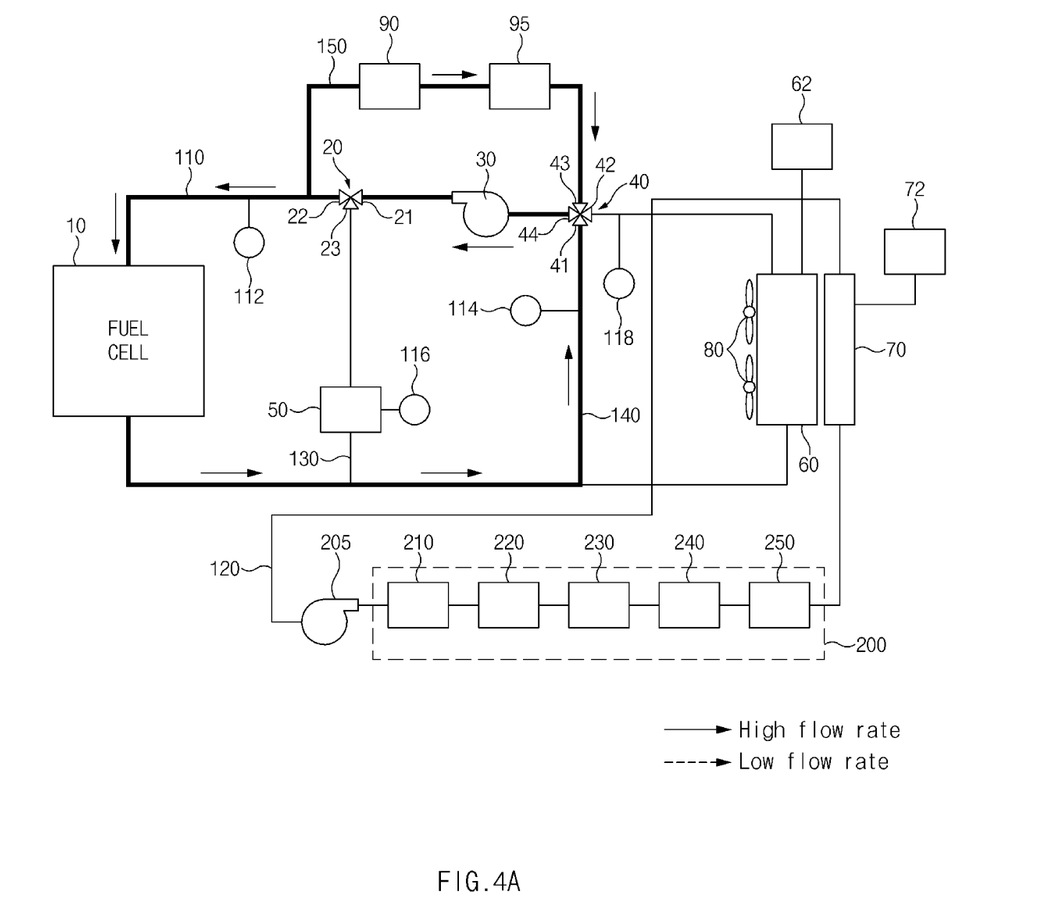
FIGS. 4A to 4C illustrate flows of coolant according to an opening degree of a valve according to various embodiments.
Figure 4B:
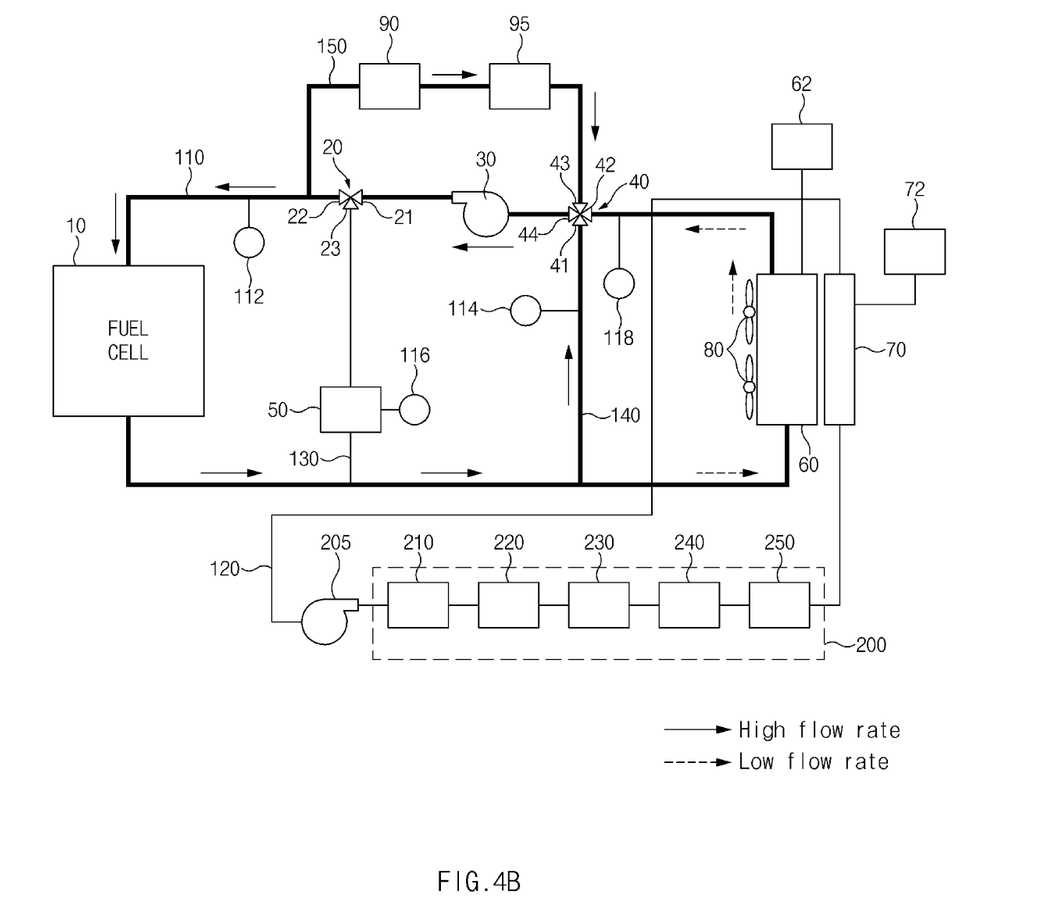
Figure 4C:
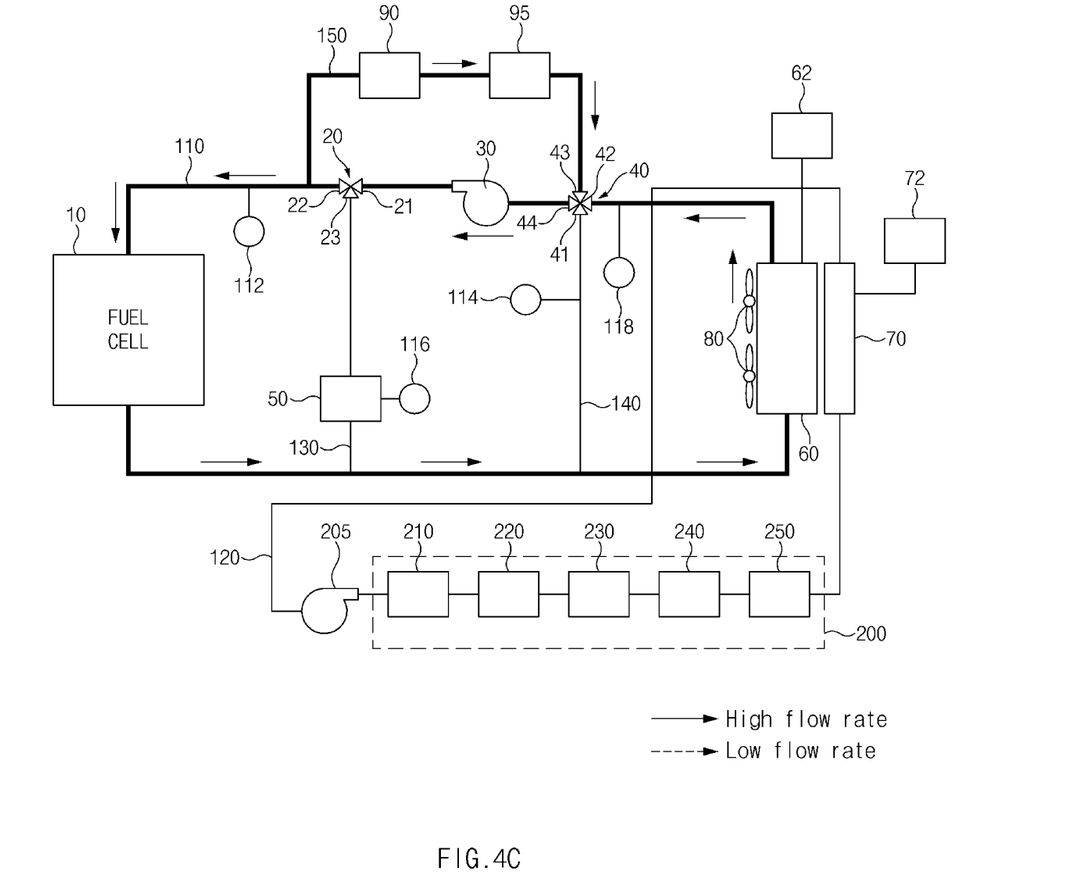

FIG. 3 illustrates a block diagram of a fuel cell system, in which first coolant flows, according to various embodiments, and FIG. 4A to 4C illustrate flows of the coolant according to an opening degree of a valve. Among the configurations illustrated in FIG. 3, the configurations having the same reference numerals perform the same functions as that of the configurations illustrated in FIG. 1 or 2, and a repeated description thereof will be omitted.

Referring to FIG. 3, m denotes a flow rate of the first coolant. For example, $m_1$ may denote a flow rate of the first coolant that exits from the fuel cell stack 10 and enters the second valve 40 without passing through the first radiator 60, $m_2$ may denote a flow rate of the first coolant that exits from the fuel cell stack 10 and enters the second valve 40 after passing through the first radiator 60, $m_3$ may denote a flow rate of the first coolant that enters the fuel cell stack 10 and exits from the second valve 40, $m_4$ may denote a flow rate of the first coolant that exits from the first valve 20 and enters the first pump 30 via the ion filter 95, and $m_5$ may denote a flow rate of the first coolant that exits from the first pump 30 and passes through the first valve 20. Furthermore, T denotes a temperature of the first coolant. For example, $T_1$ may denote a first coolant temperature at the outlet of the fuel cell stack 10, $T_2$ may denote a first coolant temperature at the outlet of the first radiator 60, $T_3$ may denote a coolant temperature at the inlet of the fuel cell stack 10, and $T_4$ may denote a temperature of the first coolant that passes through the heater 50. The flow rate and the temperature of the first coolant may be expressed as in Equation 1.

$$m_3 = m_1 + m_2$$

$$m_5 = m_3 + m_4$$

$$T_2 \leq T_3 \leq T_1 \qquad \text{[Equation 1]}$$

The fuel cell system may adjust a ratio of the mixed first coolant and the temperature of the first coolant through adjustment of the opening degree of the second valve 40. For example, FIG. 4A illustrates a locked (closed) state (an opening degree=0) of the second valve 40, and in this case, because the second port 42 of the second valve 40 is closed, the first coolant that exits from the fuel cell stack 10 may flow on the third connection line 140 without passing via the first radiator 60. FIG. 4B illustrates a state, in which a portion of the second valve 40 is opened (0<the opening degree<1), and in this case, because the first port 41 and the second port 42 of the second valve 40 are partially opened, a portion of the first coolant flows on the third connection line 140 and the remaining portions thereof may pass via the first radiator 60. FIG. 4C illustrates a fully opened (completely opened) state (an opening degree=1) of the second valve 40, and in this case, because the first port 41 of the second valve 40 is closed, the whole first coolant that exits from the fuel cell stack 10 may pass via the first radiator 60.

The first coolant temperature $T_1$ at the inlet of the fuel cell stack 10 may be expressed as in Equation 2.

$$T_3 = T_1(1-OR) + C_k T_2 OR \qquad \text{[Equation 2]}$$

In Equation 2, an open ratio (OR) denotes an opening degree of the second valve 40. $C_K$ may denote a correction coefficient used to determine the opening degree of the second valve 40. The fuel cell system may determine the opening degree of the second valve 40 such that the first cooling temperature $T_3$ at the inlet of the fuel cell stack 10 may reach the target temperature more precisely through setting of the correction coefficient.

The fuel cell system may calculate the opening degree (OR) of the second valve 40 through Equation 3 such that $T_3$ may satisfy the target temperature $T_{3c}$.

$$OR = (T_1 - T_{3c})/(T_1 - C_k T_2) \qquad \text{[Equation 3]}$$

Figure 5:
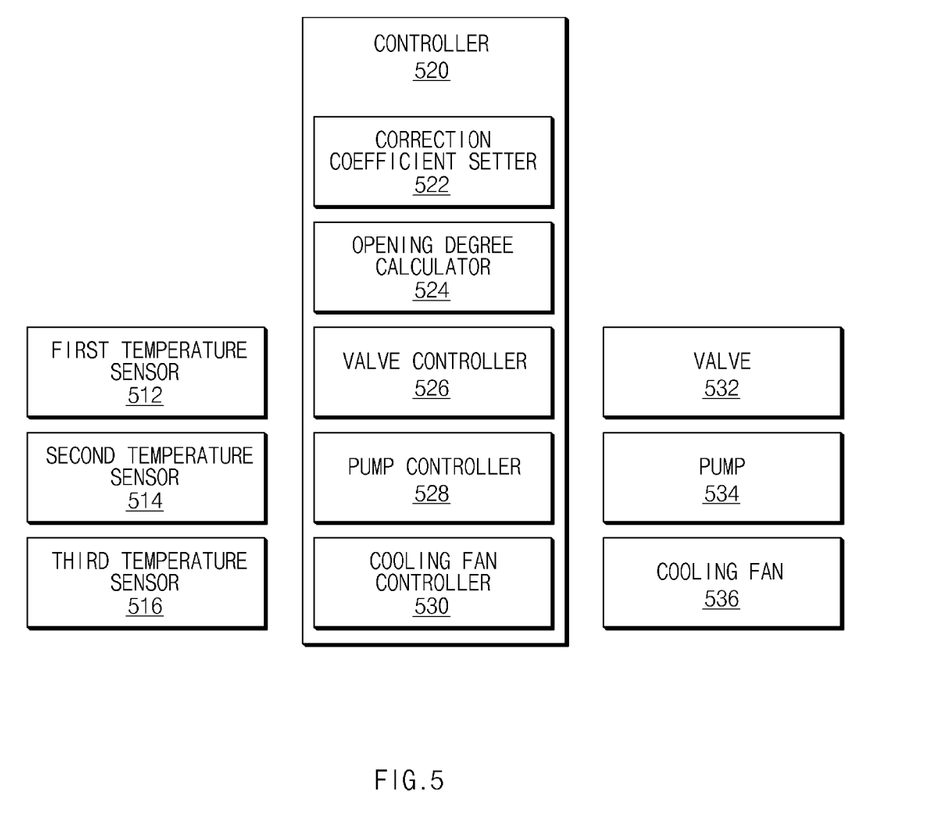
FIG. 5 illustrates a block diagram of a fuel cell system according to various embodiments.

FIG. 5 illustrates a block diagram of a fuel cell system according to various embodiments. The configuration illustrated in FIG. 5 may be a hardware device or a program (or an application) including instructions.

Referring to FIG. 5, a first temperature sensor 512, a second temperature sensor 514, and a third temperature sensor 516 may have structures that are the same as or similar to those of the first temperature sensor 112, the second temperature sensor 114, and the fourth temperature sensor 118 of FIG. 1, respectively, and may perform the same or similar functions. A valve 532, a pump 534, and a cooling fan 536 may have structures that are the same as or similar to those of the second valve 40, the first pump 30, and the cooling fan 80 of FIG. 1, respectively, and may perform the same or similar functions.

A controller 520 may be a hardware device, such as a processor or a central processing unit (CPU), or a program implemented by a processor. The controller 520 may be connected to the plurality of sensors 512, 514, and 516, the valve 532, the pump 534, and the cooling fan 536, and may perform an overall function of the fuel cell system for controlling the coolant temperatures. To achieve this, the controller 520 may include a correction coefficient setter 522, an opening degree calculator 524, a valve controller 526, a pump controller 528, and a cooling fan controller 530. The configurations included in the controller 520 may be present separately or may be implemented by one integrated module.

The correction coefficient setter 522 may set a correction coefficient for controlling the opening degree of the valve 532. For example, the correction coefficient setter 522 may set an initial value of the correction coefficient to 1, and may adjust the correction coefficient based on a difference between the coolant temperature at the inlet of the fuel cell stack 10 measured through the first temperature sensor 512 and the target temperature.

The opening degree calculator 524 may calculate the opening degree of the valve 532 based on the coolant temperature at the outlet of the fuel cell stack 10 measured through the second temperature sensor 514, the coolant temperature at the outlet of the first radiator 60 measured through the third temperature sensor 516, the preset target temperature, and the correction coefficient. For example, the opening degree calculator 524 may calculate the opening degree of the valve 532 by using Equation 3, which has been described above.

The valve controller 526 may adjust the opening degree of the valve 532 according to the opening degree determined by the opening degree calculator 524, and the pump controller 528 and the cooling fan controller 530 may control the RPMs of the pump 534 and the cooling fan 536, respectively.

Figure 6:
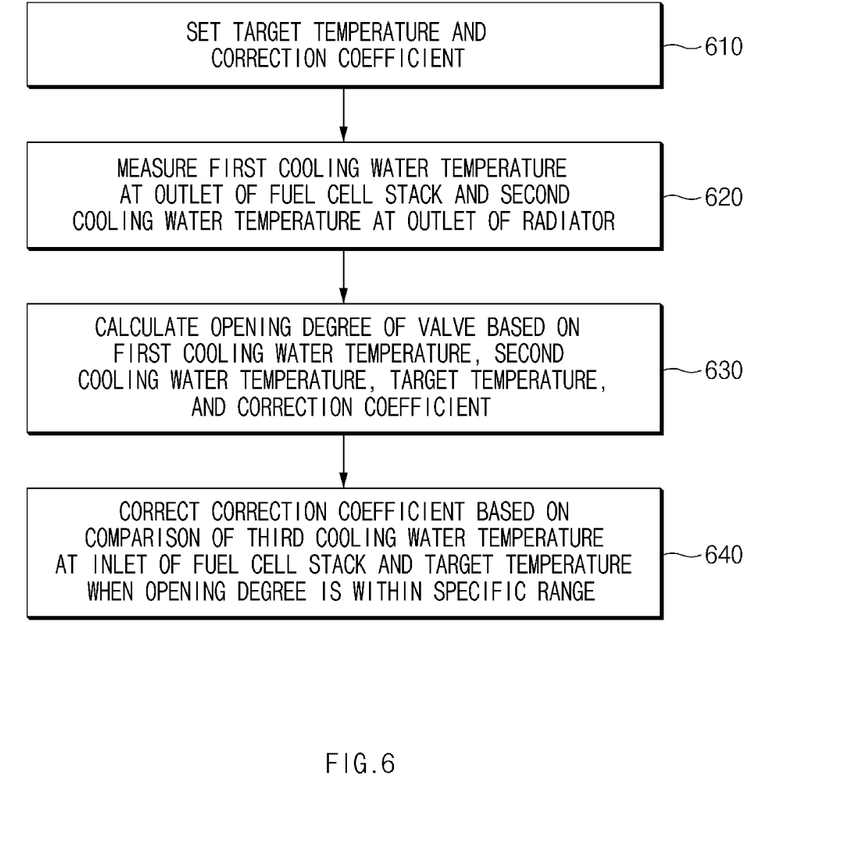
FIG. 6 illustrates a flowchart of an operation for controlling an opening degree of a valve and a correction coefficient according to various embodiments.

FIG. 6 illustrates a flowchart of an operation for controlling an opening degree of a valve and a correction coefficient according to various embodiments. The operations described hereafter may be implemented by the fuel cell system or may be implemented by the configurations (e.g., the controller 520) included in the fuel cell system.

Referring to FIG. 6, in operation 610, the controller 520 may set the target temperature at the inlet of the fuel cell stack 10 and the correction coefficient for controlling the opening degree of the valve 532.

In operation 620, the controller 520 may measure the coolant temperature at the outlet of the fuel cell stack 10 (hereinafter, may be referred to as 'a first coolant temperature') and the coolant temperature at the outlet of the first radiator 60 (hereinafter, may be referred to as a 'second coolant temperature').

In operation 630, the controller 520 may calculate the opening degrees of the valves based on the first coolant temperature, the second coolant temperature, the target temperature, and the correction coefficient.

In operation 640, the controller 520 may correct the correction coefficient based on comparison of the coolant temperature (hereinafter, may be referred to as a 'third coolant temperature') at the inlet of the fuel cell stack and the target temperature when the calculated opening degree is within a specific range (e.g., more than 0 and not more than 1).

Figure 7:
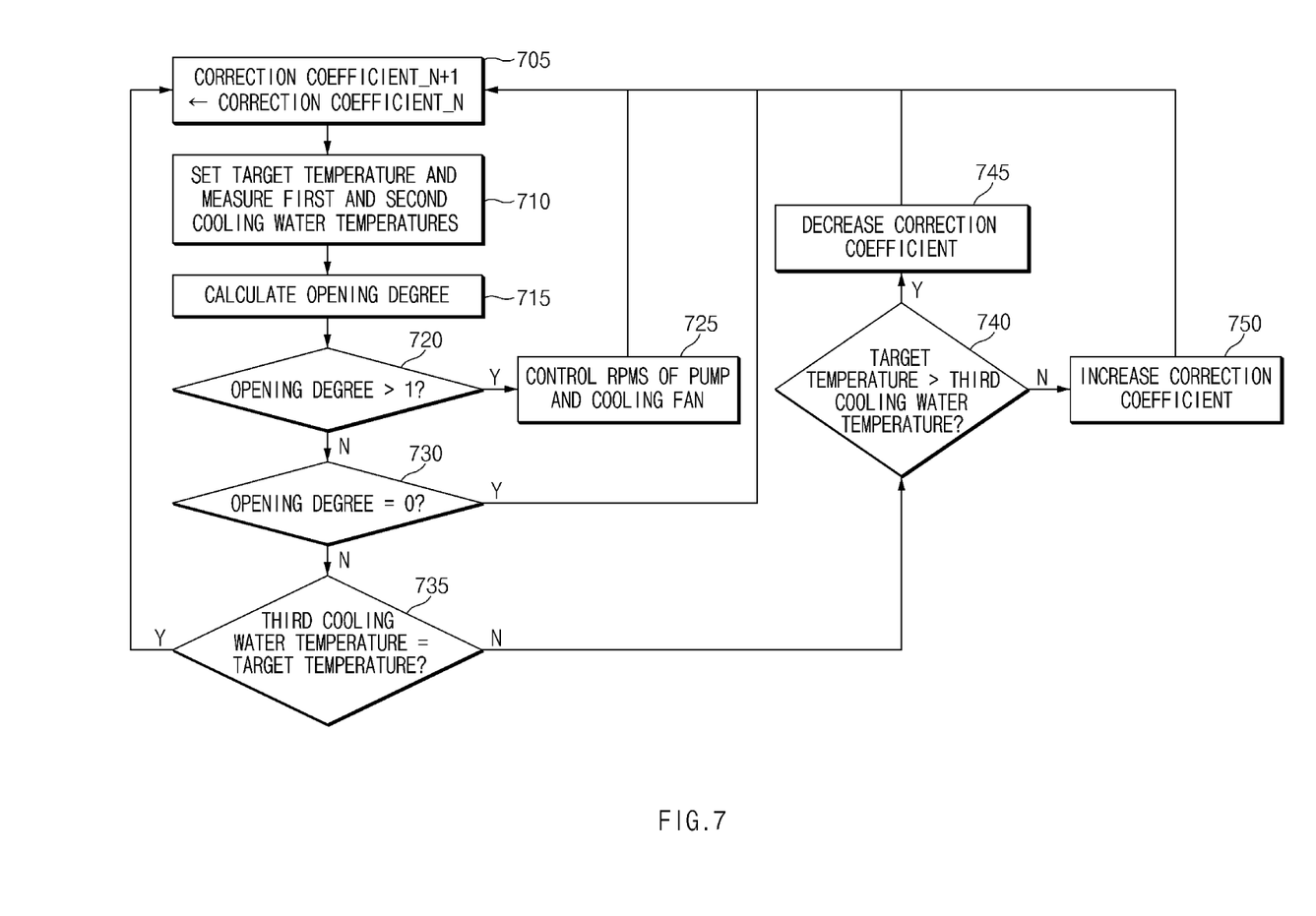
FIG. 7 illustrates a flowchart of a detailed operation for controlling an opening degree of a valve and a correction coefficient according to various embodiments.

FIG. 7 illustrates a flowchart of a detailed operation for controlling an opening degree of a valve and a correction coefficient according to various embodiments.

Referring to FIG. 7, in operation 705, the controller 520 may set the correction coefficient. For example, the controller 520 may set the initial value of the correction coefficient to 1.

In operation 710, the controller 520 may set the target temperature and measure the first and second coolant temperatures.

In operation 715, the controller 520 may calculate the opening degree of the valve 532 based on the first and second coolant temperatures, the target temperature, and the correction coefficient.

In operation 720, the controller 520 may identify whether the calculated opening degree is more than 1.

When the opening degree is more than 1, the controller 520 cannot control the third cooling temperature to the target temperature through the opening degree of the valve 532 anymore, and thus in operation 725, may control the RPMs of the pump 534 and the cooling fan 536.

When the opening degree is not more than 1, in operation 730, the controller 520 may identify whether the opening degree is 0. When the opening degree is 0, the controller 520 may repeat operations 705 to 720 without opening the valve 532 (a closed state). For example, when the fuel cell system is in an initial temperature rising state, the third coolant temperature is lower than the target temperature, and thus, it is not necessary for the controller 520 to open the valve 532.

When the opening degree is not more than 1 and is not 0, in operation 735, the controller 520 may identify whether the third coolant temperature is the same as the target temperature. As another example, the controller 520 may identify whether a difference between the third coolant temperature and the target temperature is within a specific range (e.g., 1%) even though they are not the same. When the third coolant temperature is the same as the target temperature or the difference therebetween is within the specific range, the controller 520 may repeat operations 705 to 720 without correcting the correction coefficient.

When the difference between the third coolant temperature and the target temperature deviates from the specific range, in operation 740, the controller 520 may identify whether the target temperature is higher than the temperature of the third coolant. When the target temperature is higher, the controller 520 may decrease the correction coefficient (operation 745), and when the target temperature is lower, the controller 520 may increase the correction coefficient (operation 750).

One of the functions of the thermal management system is to adjust a temperature of the coolant introduced into an inlet of the fuel cell stack to a target temperature by discharging the heat generated in the fuel cell stack to the atmosphere through a radiator. It is an important problem to control RPMs of a pump and a cooling fan in order to adjust a temperature of the coolant to the target temperature. However, because the RPMs of the pump and the cooling fan have large variations, a more precise control is necessary to reduce a difference between the temperature of the coolant and the target temperature. According to the embodiments of the present disclosure, the fuel cell system may control the temperature of the coolant more precisely through the opening degrees of the valves.

According to the embodiments of the present disclosure, the fuel cell system may adjust the coolant temperature at the inlet of the fuel cell stack to the target temperature more promptly.

According to the embodiments of the present disclosure, the fuel cell system may control the coolant temperature while coping with a change of load promptly through a complex control of the pump, the cooling fan, and the valves.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A temperature control apparatus for fuel cell system comprising:
   a fuel cell stack;
   a first cooling line configured to circulate a first coolant that passes via the fuel cell stack;
   a first radiator disposed on the first cooling line and being configured to cool the first coolant;
   a valve configured to switch a flow path of the first coolant to the fuel cell stack or the first radiator; and
   a controller connected to the valve, and the controller being configured to:
      set a target temperature at an inlet of the fuel cell stack and a correction coefficient for controlling an opening degree of the valve;
      measure a first coolant temperature at an outlet of the fuel cell stack and a second coolant temperature at an outlet of the first radiator;
      calculate the opening degree of the valve based on the first coolant temperature, the second coolant temperature, the target temperature, and the correction coefficient; and
      correct the correction coefficient based on comparison of a third coolant temperature at the inlet of the fuel cell stack and the target temperature, in response to the opening degree being within a first range.

2. The apparatus of claim 1, wherein the controller is further configured to:
   set the correction coefficient to be a previous value, in response to a difference between the third coolant temperature and the target temperature being within a second range;
   decrease the correction coefficient, in response to the difference between the third coolant temperature and the target temperature deviating from the second range and the target temperature being higher than the third coolant temperature; and
   increase the correction coefficient, in response to the difference between the third coolant temperature and the target temperature deviating from the second range and the target temperature being lower than the third coolant temperature.

3. The apparatus of claim 1, further comprising:
a first temperature sensor disposed at the inlet of the fuel cell stack;
a second temperature sensor disposed at the outlet of the fuel cell stack; and
a third temperature sensor disposed at the outlet of the first radiator.

4. The apparatus of claim 1, further comprising:
a cooling fan disposed on the first cooling line and configured to blow exterior air to the first radiator; and
a pump disposed on the first cooling line and configured to pump the first coolant,
wherein the controller is configured to control an RPM of at least one of the cooling fan and the pump, in response to the opening degree deviating from the first range.

5. The apparatus of claim 4, wherein the controller is further configured to:
control the RPM of the cooling fan and the RPM of the pump such that a total power consumption becomes minimal as the third coolant temperature reaches the target temperature through a decrease in the RPM of the cooling fan and an increase in the RPM of the pump, where the total power consumption is a sum of a power consumption corresponding to the RPM of the cooling fan and a power consumption corresponding to the RPM of the pump.

6. The apparatus of claim 4, wherein the controller comprises:
a valve controller configured to control the opening degree of the valve; a cooling fan controller configured to control the RPM of the cooling fan; and a pump controller configured to control the RPM of the pump.

7. The apparatus of claim 6, wherein the valve controller, the cooling fan controller, and the pump controller are integrated in one module.

8. The apparatus of claim 1, further comprising:
a second cooling line configured to circulate a second coolant that passes via an electric component;
a second radiator disposed on the second cooling line and being configured to cool the second coolant;
a heat exchanger configured to exchange heat between the first coolant and the second coolant; and
a cooling fan configured to cool any one or any combination of the first radiator and the second radiator.

9. A processor-implemented method for operating a fuel cell system including a fuel cell stack, the method comprising:
setting a target temperature at an inlet of the fuel cell stack and a correction coefficient for controlling an opening degree of a valve;
measuring a first coolant temperature at an outlet of the fuel cell stack and a second coolant temperature at an outlet of a first radiator;
calculating the opening degree of the valve based on the first coolant temperature, the second coolant temperature, the target temperature, and the correction coefficient; and
correcting the correction coefficient based on comparison of a third coolant temperature at the inlet of the fuel cell stack and the target temperature, in response to the opening degree being within a first range.

10. The method of claim 9, wherein the correcting of the correction coefficient includes:
setting the correction coefficient to a previous value, in response to a difference between the third coolant temperature and the target temperature being within a second range;
decreasing the correction coefficient, in response to the difference between the third coolant temperature and the target temperature deviating from the second range and the target temperature being higher than the third coolant temperature; and
increasing the correction coefficient, in response to the difference between the third coolant temperature and the target temperature deviating from the second range and the target temperature being lower than the third coolant temperature.

11. The method of claim 9, further comprising:
controlling an RPM of any one or any combination of a cooling fan and a pump, in response to the opening degree deviating from the first range.

12. The method of claim 11, wherein the controlling of the RPM comprises:
controlling the RPM of the cooling fan and the RPM of the pump such that a total power consumption becomes minimal as the third coolant temperature reaches the target temperature through a decrease in the RPM of the cooling fan and an increase in the RPM of the pump, where the total power consumption is a sum of a power consumption corresponding to the RPM of the cooling fan and a power consumption corresponding to the RPM of the pump.

13. A non-transitory computer-readable storage medium storing instructions that, when executed by a processor, cause the processor to perform the method of claim 9.

\* \* \* \* \*